United States Patent [19]
Hershey et al.

[11] Patent Number: 4,924,378
[45] Date of Patent: May 8, 1990

[54] LICENSE MANGAGEMENT SYSTEM AND LICENSE STORAGE KEY

[75] Inventors: Antoinette F. Hershey, Acton; Andrew H. French, Lexington; Christopher P. Boire, Westborough, all of Mass.

[73] Assignee: Prime Computer, Inc., Natick, Mass.

[21] Appl. No.: 205,986

[22] Filed: Jun. 13, 1988

[51] Int. Cl.$^5$ .......... G06F 3/00; G06F 15/16; H04L 9/00

[52] U.S. Cl. .............. 364/200; 364/228.3; 364/232.8; 364/234; 364/236.8.242.94; 364/260.4; 364/260.81; 380/4

[58] Field of Search ........ 364/200, 300, 900; 380/4

[56] References Cited

U.S. PATENT DOCUMENTS 4,780,821 10/1988 Crossley .................. 364/200
4,827,508 5/1989 Shear ....................... 380/4

Primary Examiner—Raulfe B. Zache
Attorney, Agent, or Firm—David G. Conlin; Robert M. Asher, Dike, Bronstein, Roberts & Cushman

[57] ABSTRACT

A license storage key is provided for securely storing information regarding which licenses have been purchased for a network of computers, how many of each license have been purhcased, and any time limits associated with each license. An application program to be run on a computer must be assigned a license in the license storage key associated with the computer before it will be permitted to run. If a license cannot be found on the local key, a license may be found on another key in the network of computers and transferred to the local key so that the application program may be run in this case, when the license is released. The license storage key contains a hardware clock which is used to determine whether a license has expired.

29 Claims, 11 Drawing Sheets

LICENSE MANGAGEMENT SYSTEM AND LICENSE STORAGE KEY

BACKGROUND OF THE INVENTION

The present invention is directed to a system for managing software licenses by limiting the number of computers permitted to run a program to the number of licenses granted, limiting the grant of a license to a predetermined time period and permitting licenses to be transferred from one computer to another.

Conventionally, a company with a multi-user computer network seeks licenses from software vendors to run a number of desired software application programs. Since it is normally not necessary to be able to run an application program on all or most of the computers on a networked system, the number of licenses which are purchased is significantly less than the total number of computers in the networked system. The company would determine which computer would receive each license which has been purchased to run any particular application program. The programs which have been licensed for a particular computer are loaded into that computer for use. The programs which are loaded are copy protected so that they cannot be replicated onto an unlicensed machine.

This conventional system of licensing creates problems for the individual users. An individual user on a computer only has access to the programs which have been licensed to that particular computer. Times will arise when the individual will need to search out another computer that has available a program which the user wishes to run.

This prior art system also creates difficulties when loading software into the computers of a customer. First of all, the programs must be copy protected. Secondly in loading the programs onto the computers, precautions must be taken to prevent unlicensed program from being loaded. One method presently used involves providing a custom made tape for each customer. Only those programs which have been licensed to the customer are recorded on the tape. Each program is copy protected. In addition, gaps are placed throughout the tape in a coded manner such that the tape cannot be read by an ordinary tape reader. A proprietary tape reader of the software vendor is used to read the programs from the specially made tape. A table at the end of the tape gives the license information as to how many licenses have been purchased for each application program on the tape. In loading programs from such a tape, the proprietary tape reader must shuttle back and forth between the table and the programs to make sure there is a license remaining before loading an application program.

It is an object of the present invention to provide a license management system which flexibly permits a user at a computer to access any program which has been licensed to the network so long as that program is run on no more computers on the network than the number of licenses which have been purchased for that program.

It is a further object of the invention to provide a license management system in which individual application programs cannot be run unless they are licensed, thus eliminating the need to copy protect the programs.

SUMMARY OF THE INVENTION

The present invention is directed to a method and apparatus for managing computer program licenses.

A license storage area is provided in communication with a computer. The license storage area stores an indication of how many licenses are available for any particular computer application program. The license storage area provides memory locations in which a license may be assigned to an execution environment. A license is assigned by writing a code representative of the execution environment in a memory location associated with the application program whose license is being assigned. A license management system (LMS) daemon is a program in the computer for communicating with the license storage area, the application program and other LMS daemons. The available licenses in a storage area may be transferred by the LMS daemon from one computer to another as long as both computers are within a designated group of computers.

The license storage area may be a device separate from the computer. Such a device is called a license storage key. The key includes a processor which at least performs the following functions: decodes encrypted messages that it receives; performs the actions dictated by the contents of the messages, including updating the license storage data base; sends encrypted messages. The key also includes a clock for permitting the imposition of time limits on a license.

The system of the invention can be used to load selectively licensed programs into a computer. By connecting the CPU to a license storage key, the distribution medium (e.g., tape, compact disk) containing the licensed programs need not be copy protected. Programs which have associated licenses on the license storage key are copied onto the disk storage unit associated with that CPU. Since these programs cannot be run unless a license is available, it is not necessary to copy protect the distribution medium. The distribution medium contains a directory listing of every program on the distribution medium along with its location on the distribution medium, so that the programs which contain licenses in the storage key can be easily located and copied onto the disk storage unit associated with that CPU.

In a computer network, the present invention can be used with a plurality of storage keys, one for each computer on the network. Licenses for a program can be transferred between keys. This permits a user to gain access to a license for any program which is licensed to the computer network. The licensed programs are not restricted to use on a single CPU in the network. If a license for a program is not found in the local storage key, the local LMS daemon may transfer a license from a key elsewhere in the network to the local storage key, thus making a license available for use by the program.

Other objects and advantages of the invention will become apparent during the following description of the presently preferred embodiment of the invention taken in conjunction with the drawings.

DETAILED DESCRIPTION OF THE PREFERRED EMBODIMENT

Figure 1:
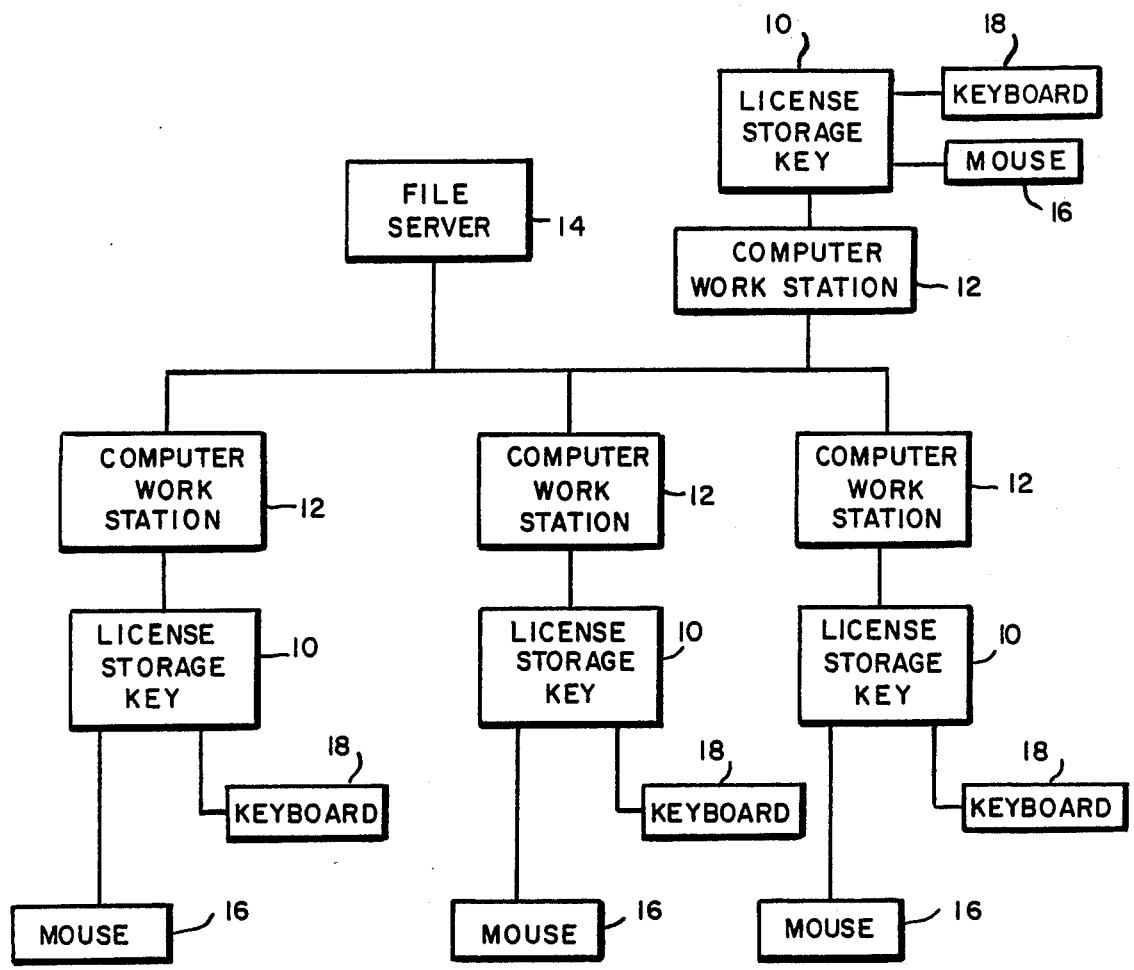
FIG. 1 is a schematic block diagram of a computer network using the license storage keys of the present invention.

Referring now to FIG. 1, license storage keys 10 of the present invention are shown in conjunction with a computer network. A license storage key is computer device which essentially contains memory space for storing an indication of how many licenses are available for any given application program and for storing assignments of licenses. A license for a program is assigned to an execution environment so as to permit the program to run in that environment. An execution environment identifies the computer resources which will be used to run a program. On UNIX based systems such an environment is called a process. Other terms for an execution environment are also commonly used, such as job.

The most advantageous benefits of the invention are derived when it is used in a multi-user system. However, the invention may be equally used on a single independent computer. In the embodiment of FIG. 1, each computer work station 12 is connected to its own key 10. It would also be possible to achieve the objects of the present invention by providing a single key 10 connected to the file server 14. A key 10 holds the information as to which programs are licensed, how many licenses are available for that program and which licenses are assigned. Thus, the key's major function is that of a license storage area. In accordance with the presently preferred embodiment, the key 10 is connected to the work station 12, and a mouse 16 and a keyboard 18 are connected to the key 10. These connections are made merely for the convenience of cable connections. It would be equally possible to implement the present invention by having each of the devices, the key 10, the mouse 16 and the keyboard 18 individually connect directly to the work station 12.

In order to implement the license management system of the present system, each application program which is run on the computer network must include checkpoints in the program which require that the key 10 be checked to determine if a license is available for assignment to that application program. Thus, if a license is not available, the application program will not be able to run.

It is desirable to take measures which discourage persons from trying to run a program without a license by getting around the checkpoints. The presently preferred embodiment of the system runs on a UNIX-based operating system. UNIX advantageously can prevent a programmer from debugging an application program. Another precaution which can be taken is to strip the symbol table for an application program from its stored executable instructions. These measures make it uneconomical for a programmer to attempt to circumvent the checkpoints.

These checkpoints in the application programs communicate via an application library with a program which is furnished along with the work station operating system. That program is known as the LMS daemon. Communications between the application library and the LMS daemon are performed using encoded requests and responses. The encryption scheme used should be very difficult to decipher so that dishonest programmers will not find it worth their while to circumvent the license management system. Another precaution is to hide the numbers for the communication ports between the application library and the daemon. The LMS daemon then communicates with the license storage key 10. These communications between the daemon and the key are also encrypted. The presently preferred encryption scheme is analogous to the Data Encryption Standard.

The license storage key 10 is discussed in more detail with reference to FIG. 2. The key 10 of the preferred embodiment is provided with its own microprocessor 20 and a memory 22. This takes some of the processing load off of the host computer. A system of the present invention may also be implemented in which the processing tasks described for the microprocessor 20 herein are performed by the host computer. The presently preferred processor 20 and memory 22 are provided on a single chip, in particular a DS5000, manufactured by Dallas Semiconductor. A crystal 24 is connected to the microprocessor 20 to synchronize the timing throughout the chip.

In order to facilitate the ability to put time limits on licenses, a clock 26 is provided in the key. The presently preferred clock is a DS1287, manufactured by Dallas Semiconductor. The time on the clock 26 is initialized by the software vendor before the key is installed for a customer. While the invention may be performed by using the host computer's system clock to keep time, it is preferable to use a hardware clock 26 in the key thereby preventing users from tampering with the clock through the software. A storage capacitor 28 is provided in the key as a protective mechanism in the event of a power outage. If there is a power outage, the storage capacitor 28 will provide enough power to the microprocessor 20 so that it can permanently store its present state safely.

The DS5000 and the DS1287 which function as the microprocessor 20 and the clock 26, respectively, are provided with a lithium battery. The battery is used only as a back-up to maintain the contents of the memory when power is removed. The lithium battery is epoxied to the top of the plastic package container of the microprocessor and the clock so that if one were trying to open the microprocessor package to discover the encryption scheme and the license manager software, it would not be possible. When the package was opened, the information within the memory would be lost as the battery is removed. Furthermore, the DS5000 does its own encryption via hardware, making it all that more difficult to extract anything meaningful from it.

In accordance with the presently preferred embodiment, the license storage key 10 is accessed from a work station 12 through the mouse interface lines. A work station generally is provided with a line which receives transmissions from a mouse on the mouse transmit line. A second line called a mouse receive line is generally provided but not used, since it is not generally a practice to send signals to the mouse. This mouse receive line is used by the license storage key 10 to receive signals from the work station 12. Signals are sent by the license storage key 10 over the mouse transmit line. Since it is not desirable to interfere with transmissions from the mouse itself, a multiplexor 30 is provided in the key 10. The microprocessor 20 waits until the mouse transmit line is clear, at which point it switches off the input line from the mouse at the multiplexor 30 long enough for data to be sent out from the microprocessor 20 through the multiplexor 30.

Requests and responses sent out by the microprocessor 20 begin with a byte which cannot be mistaken for mouse data. A mouse sends out signals representative of the numbers from −112 to +127. The mouse uses eight of the other possible bytes as button samples to identify that a button on the mouse has been depressed. The remaining eight bytes are used by the license storage key 10 for identifying a request or response.

When a computer work station 12 sends a request to the license storage key, a timer is set in the operating system of the work station. This is how the system keeps track of responses it is waiting for. If a response is not received within the time set by the timer, then an error is returned to the requestor. Since a response from the key may be interrupted by data coming in from the mouse, the operating system should be provided with means for resetting the timer if mouse data is being received while a daemon request to the key is pending.

For convenience, the lines for the keyboard 18 pass through the license storage key but are not used by the key 10 itself. This provides for ease of cable connections to the keyboard and the mouse from the license storage key 10. The cable into the license storage key 10 includes a power line and a ground line for use by the microprocessor and clock chips as well as the mouse itself.

Figure 2:
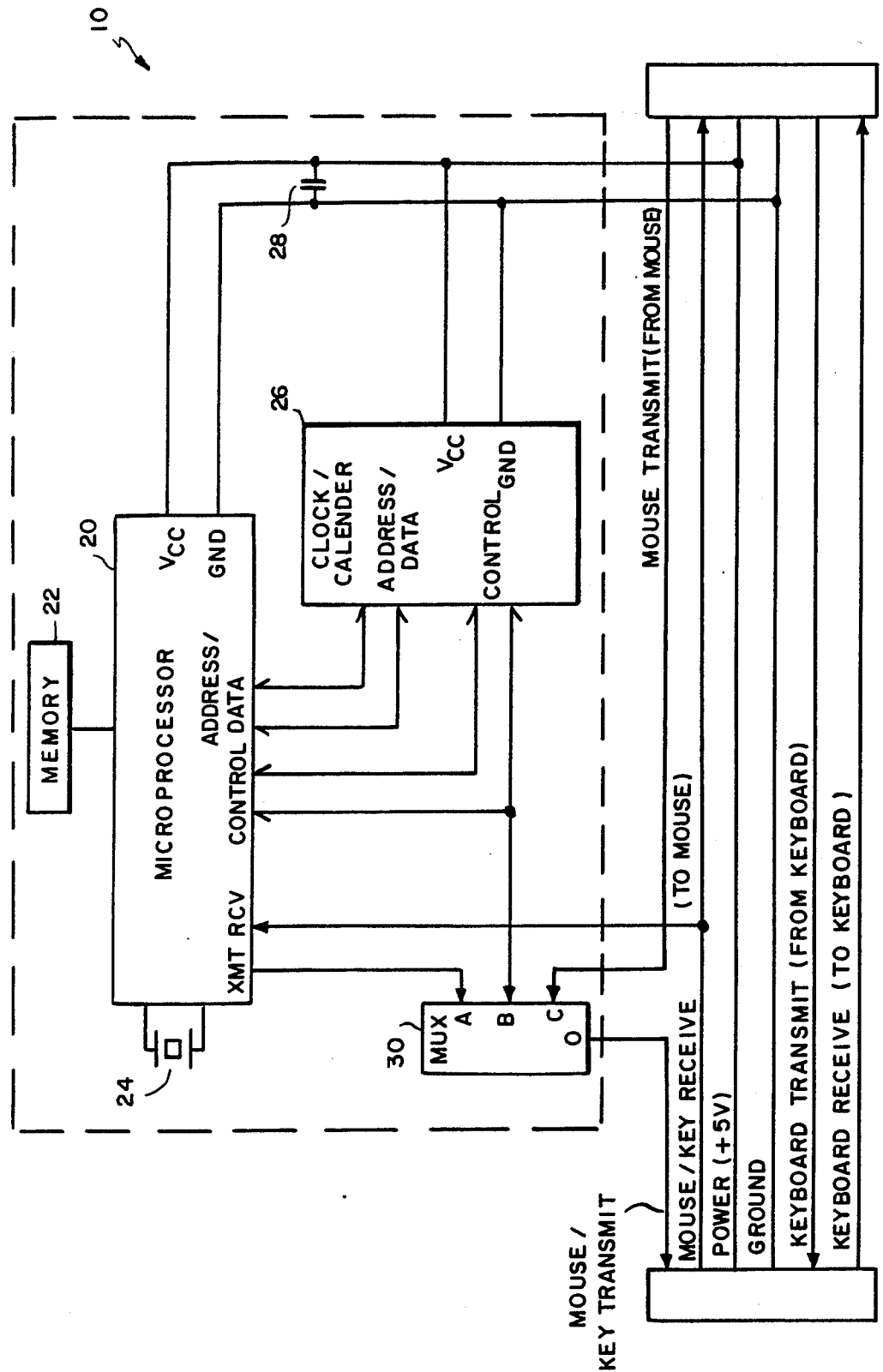
FIG. 2 is a schematic block diagram of the license storage key of the present invention.

Physically, the key 10 is a box containing a circuit board bearing the circuitry of FIG. 2. The box would have one cable connector for hooking it up to the work station, and a second cable connector for attachment to the mouse and the keyboard.

Information regarding the licenses stored within a key are stored in the memory 22. Each application program is identified by an application model number. The data may be stored with a pointer that leads from one application model number to the next. For each application model number, several pieces of information are stored. In accordance with the presently preferred embodiment, these include a number giving the original count of purchased standard licenses, the current count of standard licenses in the key, the original count of purchased delta licenses, the current count of delta licenses in the key, and the total count of licenses in the key which are presently assigned (i.e., in use). A standard license is a license whose expiration date is absolute, e.g., Dec. 31, 1999. This date is fixed when the microprocessor memory 22 is loaded with the license information by the software license vendor. A delta license is a license whose expiration date is relative, i.e., the expiration date is calculated by the microprocessor 20 at the first use of that particular license. The software vendor fixes the length of time of the license. The expiration date is determined by adding the length to the date of first use. The current license counts may well differ from the original counts as licenses expire or as licenses are transferred between keys.

In addition to the license counts, each license is individually located within the memory 22. A pointer for each application model number is used to identify the location of a chained list of the individual licenses. At the location of an assigned license, a pid number is stored. The pid (process ID number) is the identification of the process which has been assigned a license to run the program corresponding to the model number. Also located with the license is a time limit for that license. Pointers lead from one license in the chain to the next. Unassigned licenses also have a time limit stored with them, as well as an indication that the license is available for use.

A process identification number or pid is given by a UNIX-based operating system to each session in which an application program runs on the system. The process identification number or pid uniquely identifies the execution environment in which a program is running. Some large programs are divided into sub programs, each with its own pid. UNIX permits the use of a programming structure in which a parent pid is associated with a number of child pids. When such a program is run on a work station, the parent pid is listed with the assigned license in the license storage key. A sub-program which is assigned a child pid will be able to run using the license assignment to the original application program as well since the license storage key is set up to recognize that a child pid may run a program using the license which is assigned to its parent pid.

Preferably, each license storage key is provided with a different serial number by the software vendor for ease of identification. Also, we note that each key would have a header which would include such information as the serial number, the group number for that key, and the revision number of the software contained in the key. The header may also contain an indication of the last computer which booted up the key. A license management daemon on a work station can perform a "key header read" command to determine if the assignments in the key are still good or whether this is a new key that has been moved from another machine.

Figure 3:
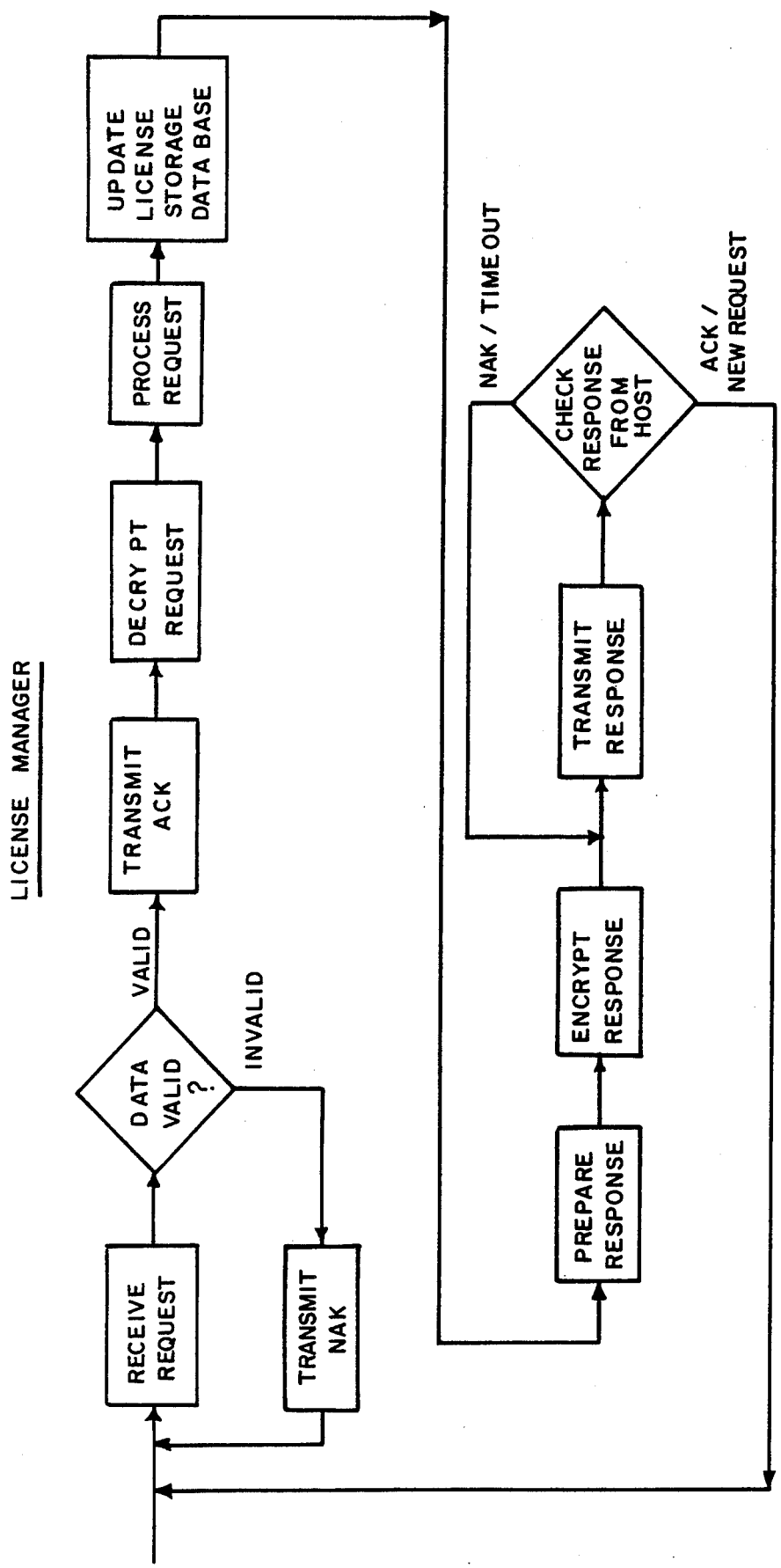
FIG. 3 is a flow chart of the protocol performed by the processor in the license storage key.

Referring now to FIG. 3, the protocol followed by the license management software in the microprocessor 20 is charted. When the microprocessor 20 receives a request over the mouse receive line, it checks the data to determine that there has been no error in the transmission. A conventional method of sending error checking bits and comparing the results of an error checking routine with those bits could be used to determine whether the data is valid. If the data is not valid, a NAK or no acknowledgment signal is transmitted to the work station.

If the data is valid, an ACK or acknowledgment signal is transferred to the work station to indicate that the request has been properly received The request is then decrypted in accordance with the encryption scheme selected for maintaining the security of the license management system.

The requests to the microprocessor 20 can then be processed. Typical requests include assigning a license to a pid, verifying that a license exists for a particular model number, releasing a license, granting a license and revoking a license. These instructions performed by the license management system will be described in greater detail below. In the license storage data base, each application program has a model number which identifies that program. Assignments of licenses for a program are made by listing in association with the model number, the pid of a process which has been assigned a license for that program. Upon processing a request, the license storage database is updated in accordance with that request.

Returning to the general protocol, a response to the request is prepared and encrypted. The response is transmitted to the work station. The microprocessor 20 then waits to receive the acknowledgment signal from the work station If a NAK or non acknowledgment signal is received, the microprocessor 20 will impose a time delay and then retransmit its response. The response will continue to be sent in response to non acknowledgment signals until a response is successfully acknowledged by the work station or a retry limit is exceeded.

Figure 4:
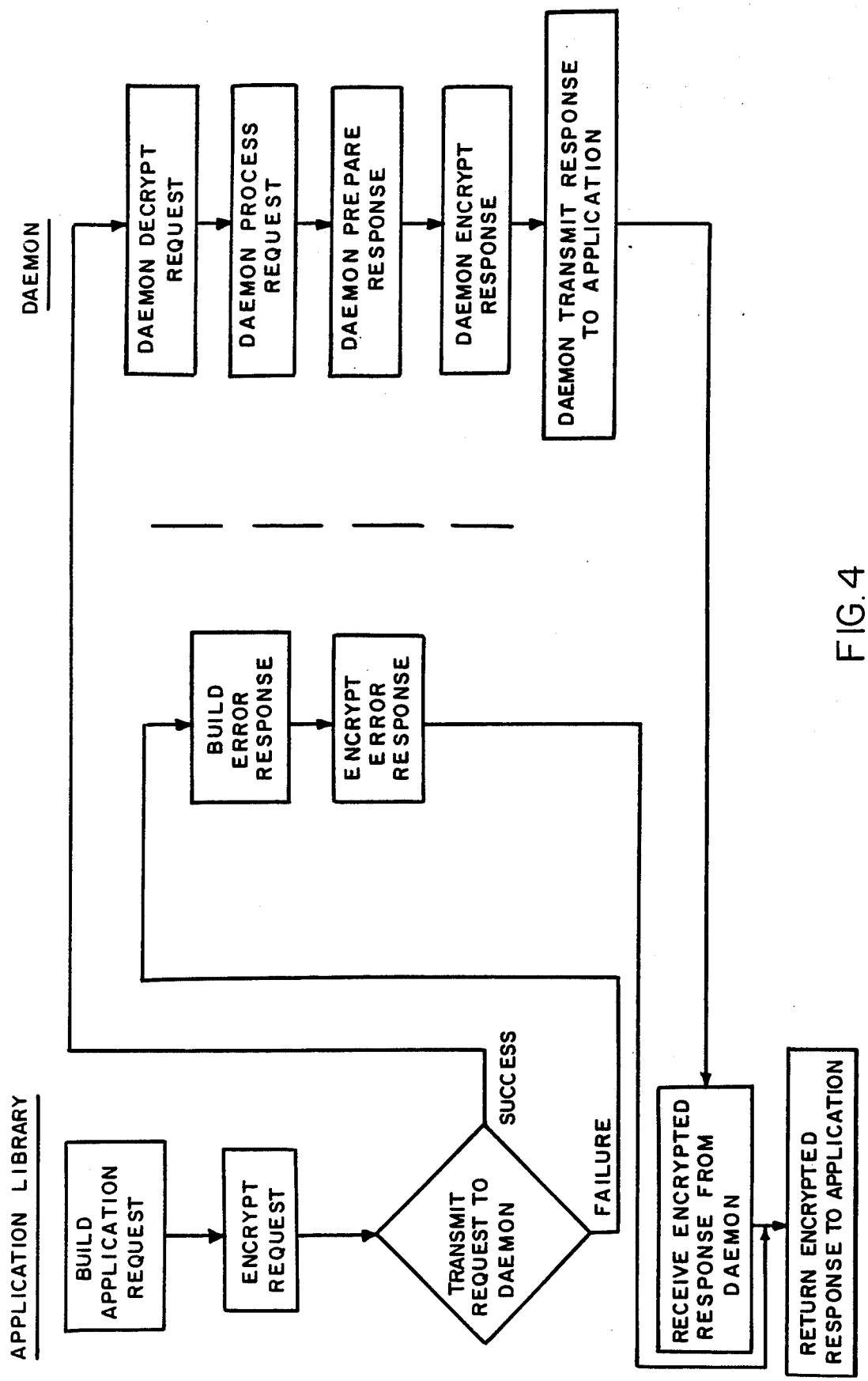
FIG. 4 is a flow diagram of the operation of an application library and the LMS daemon of the present invention in the work stations of FIG. 1.

FIG. 4 gives a flow chart of the communication between an application library and the license management system daemon. The application library provides all the necessary interfaces to the license management system required by an application program. The application program uses the application library to do all the license management work. The license management daemon is loaded into a work station by the software vendor along with the operating system. Before an application can be run on a work station, the application program (via the application library) will have to access the daemon to have a license assigned. While an application program is running, periodic checks will be made to the license management system to determine whether a license is still assigned to the application program. This checking process prevents a user from removing the key without losing the right to run programs on the attached work station. The application program (via the application library) also contacts the daemon when it is signing off so as to release the license or licenses if it is a large program with several sub programs, that was assigned to it. When the application program wishes to contact the license management system daemon, an application request is built by the application library and then encrypted. The encrypted request is transmitted to the daemon.

If the daemon incorrectly receives the request, in other words, if the request is unintelligible upon receipt, an error response is built by the daemon. The response is encrypted and returned to the application library. If the request from the application library is successfully received, the daemon decrypts the request. The request is processed. The processing of specific requests will be discussed below with respect to FIGS. 5-10. The daemon prepares a response and encrypts it. The encrypted response is then transmitted to the application library. The library receives the encrypted response from the daemon, and the application program decrypts the response and proceeds accordingly.

In addition to being able to communicate with the application library, a license management daemon can also communicate with other license management daemons. The communications from one daemon to another daemon are encrypted as they are between the application library and the daemon, and between the daemon and the license management software in the key. Through daemon-to-daemon communications, it is possible to search out and transfer a license from a key under the control of one daemon to a key under the control of another daemon. It is preferable when a software vendor initializes a key, that the license storage key be given a group number which identifies the group or network of computers which may interchange licenses. Normally, the group number identifies the customer or a division of a customer. A transfer of a license from one key to another is limited to keys within the same group. This will prevent a customer from transferring his licenses to another customer who has not paid the license fee for the programs.

In addition to the group number, transfers of licenses can be controlled by the system administrator. Each license manager daemon has a search list and an authorized list. The search list identifies all of the computers that may be looked to when an assign command is performed. If the local key does not contain a license in response to an assign command, the search list will be used to attempt to locate another key that might have an available license as required by the assign command. Likewise, in receiving communications from another daemon, the authorized list is used before communications will be entered into. The authorize list gives the system administrator control over whether or not licenses may be transferred from a particular workstation, and, if so, to where. These lists permit a system administrator to ensure that a required license is not removed from the user's workstation. The lists may be changed when the license is no longer required to permit other work stations to transfer the license.

One of the instructions performed by the license management system is the assign command. Assign is used when an application program is initially run to give the process running the program a license The assign command is also used at the checkpoints in the application program to make sure a license assignment can still be found in the key. During an assign, the license storage key is searched to determine if the process has already been assigned a license and if not, to assign a license to the process if one is available. If a license is available, the process ID (pid) number which has been associated with the application being run, is stored in the key in association with the model number for the application progam which is being assigned. A program for which more than a single license has been purchased may be assigned to more than one pid up to the amount of licenses which have been purchased. If time limits are associated with the licenses in the storage key, the licenses can only be available if their time limit has not expired.

Figure 5:
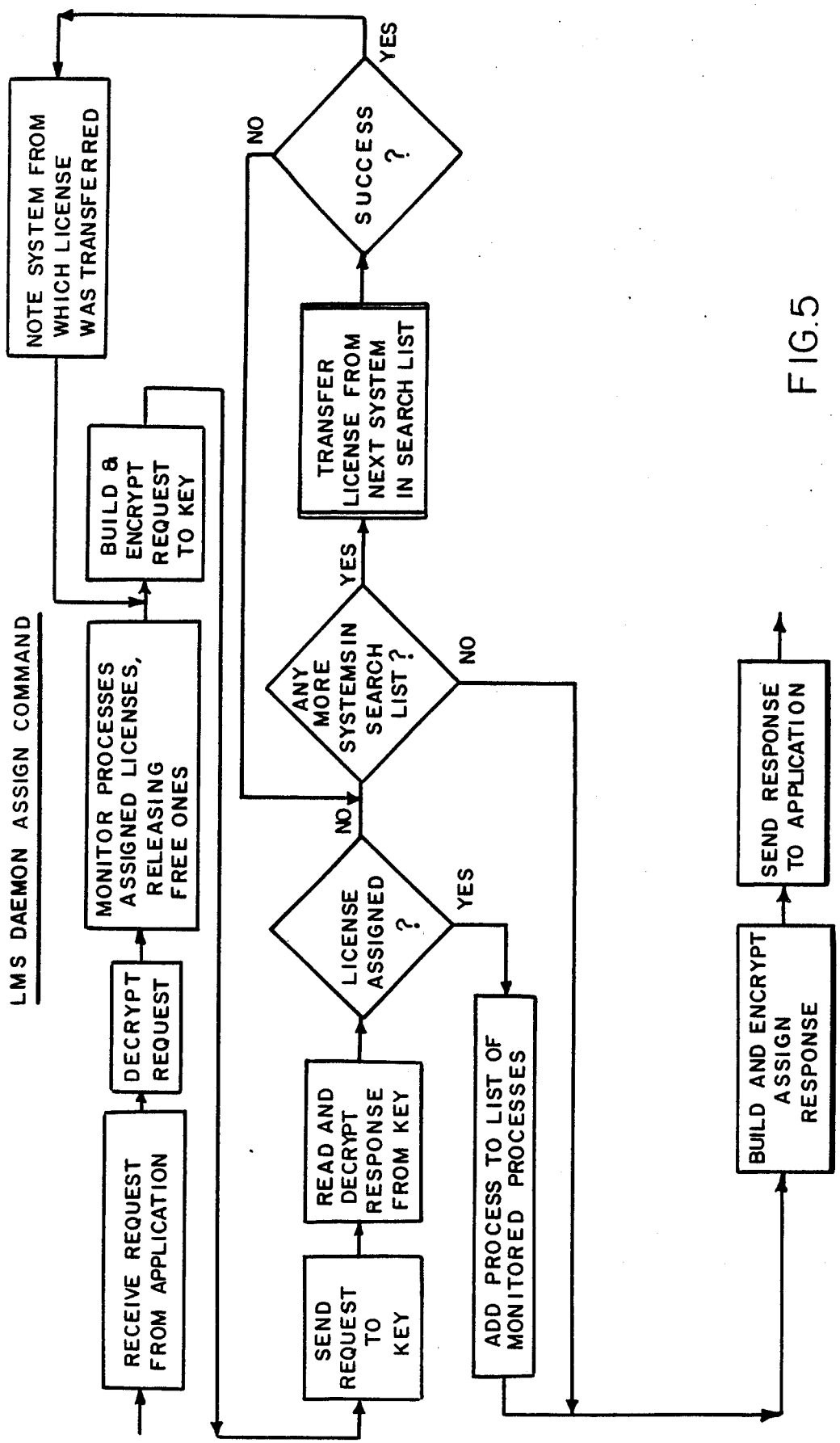
FIG. 5 is a flow chart of the LMS daemon assign command.

The procedure followed during an assign command by the license management daemon is shown in FIG. 5. The daemon receives a request and decrypts it, interpreting the request as an assign request. When an assign request is received by the daemon, the daemon goes through a process of updating the license storage data base in the key connected to the daemon's computer. Since it is possible that some of the application programs which were assigned a license are no longer running on the system, it is useful to remove these obsolete assignments from the licenses stored in the memory 22. It is possible, for instance, that an application program aborted without a proper sign off to release the license for other users. Thus, in updating the license storage data base, the daemon sifts through all of the license assignments and instructs the license storage key to release and, thus, make available any that are assigned to processes that no longer exist.

After the database is updated, the daemon builds an assign request for sending to the key. The request includes the model number that identifies the application program and a pid which identifies the particular application session making the request. The request is encrypted and sent to the license storage key. The key determines whether a license for the model number has already been assigned or whether there is a license available. If a license is available, the assignment will be made. If the pid already has a license or is given a license by the assign command the key will report back to the daemon that such assignment has been successful. If the key fails to locate an available license, a negative response is made.

The license manager daemon receives the response from the key and decrypts it. The response is interpreted to determine whether the license was successfully assigned. If the license was successfully assigned, it is added to a list of monitored processes. This list is used by the daemon to enhance the performance of monitoring licenses to release licenses from aborted processes. Monitoring involves going through the list of monitored processes to verify the continued existence of each process, and releasing all licenses previously assigned to a process which no longer exists.

If the license does not get assigned, the daemon searches through its search list of other workstations in the network. The daemon proceeds through the list one at a time, attempting to transfer a license from one of the work stations for the model number which is the subject of the assign command. Once an available license is found and transferred to the license storage key, the computer from which the license was transferred is noted. This enables the license to be returned when the process terminates. The assign command is repeated, knowing that now there is an available license for making the assignment in the license storage key. The identification of the system from which the license was transferred is remembered by the license management daemon initiating the transfer, so that the license may be transferred back to the system from which it came after it is released. If the daemon is unable to find an available license in its storage key or any of the keys in the group connected to work stations in the search list, a negative response is sent back to the application library in response to the assign command. The application program will then be unable to run on the work station.

Figure 6:
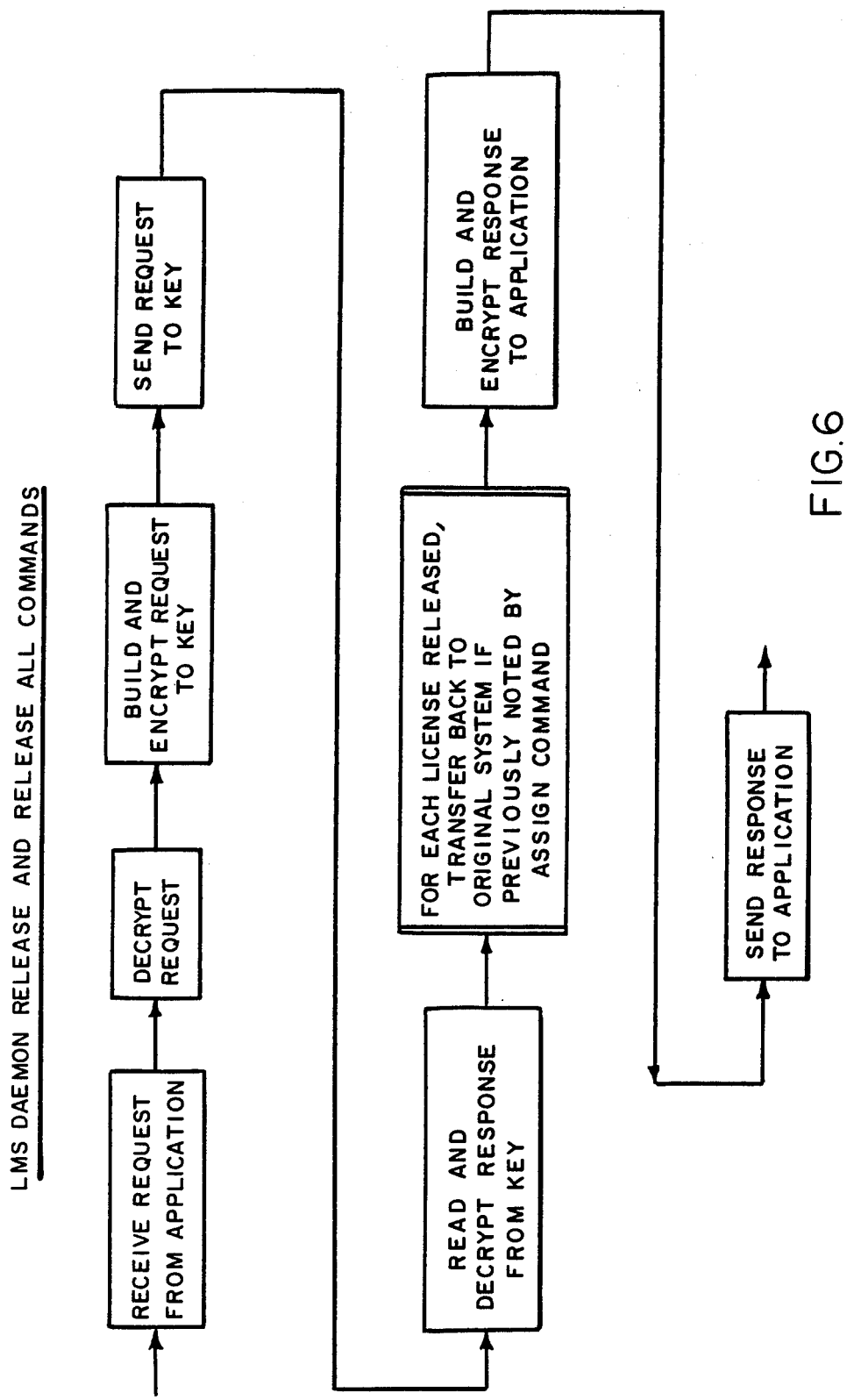
FIG. 6 is a flow chart of the LMS daemon release and release all commands.

The procedure for the daemon in executing a release or release all command is very simple, as shown in FIG. 6. The procedure for the daemon after receiving and decrypting a release or release all request begins by encrypting the request and sending it to the key. The key then performs the function and returns its response. The response is decrypted and interpreted by the daemon.

A release command instructs the key to erase the assignment of a license for a particular model application program assigned to a particular pid. If the particular application program model number cannot be found in the storage license key, the key returns an encrypted message indicating that the license was not found. This is returned as an error message to the appliation program. If upon finding the model number for the program in the license storage key, it is found that no licenses are assigned for that model number, then a positive acknowledgment response is returned. If there are licenses assigned under this application program model number, then the pid in the release license command is searched for and when it is found it is erased. A positive acknowledgment signal can then be returned to the daemon. If the license was transferred to the local key as part of an assign command, the daemon will transfer it back to the key attached to the work station from which the license was originally transferred.

The release all licenses command is provided as a single command which can release all licenses that have been assigned to a particular pid. There are times when a work station needs a number of application programs to run at the same time. For example, there are computer aided design programs which require a full complement of several applications before they can run. Thus, there will be a plurality of licenses assigned to the pid for the session being run on that work station. Upon signing off from a multi-application program such as a computer aided design (CAD) program, a release all licenses command is used to erase the assignment of all licenses in the license storage key that have been assigned to the pid for that session. Each license thus released which also was transferred to the local key as part of an assign command, will be transferred back to the key attached to the workstation from which the license was originally transferred.

Figure 7:
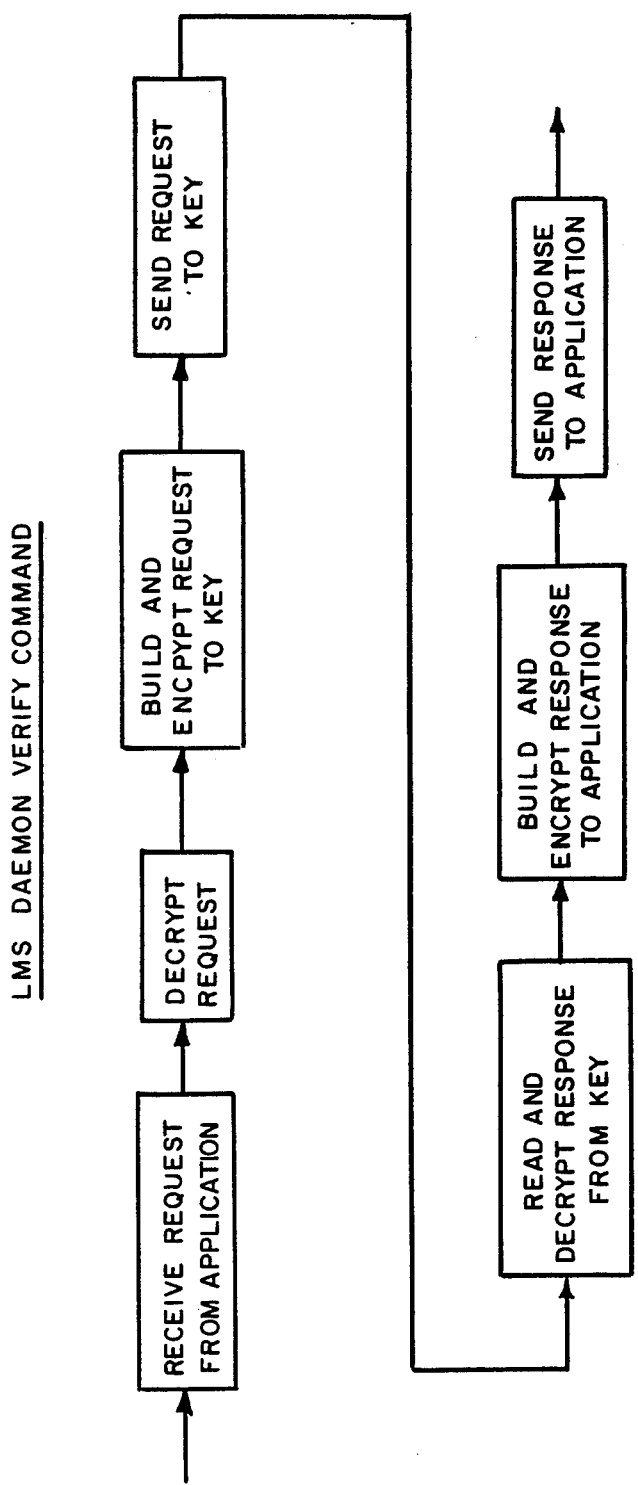
FIG. 7 is a flow chart of the LMS daemon verify command.

The procedure for a daemon in executing the verify command is shown in FIG. 7. The verify license command is used to search the license storage key to determine if a particular application model number has any licenses granted to it in the license storage key. If the application model number cannot be found in the storage key or if the count of licenses for a model number is 0, then an error response is returned. If the model number is found and there are licenses available, each license is checked to determine that the present time is less than the time limit corresponding to each available license. As soon as one license has been found which remains unexpired, then a positive acknowledgment signal is returned.

A grant command is initially performed by the software vendor when it loads a license storage key with the licenses which were purchased. The grant command is also used during a transfer request. During a transfer, if the searched for license is found in another key, the license will be revoked from that key and granted to the new key. The grant command may be used for multiple grants of licenses.

Figure 8:
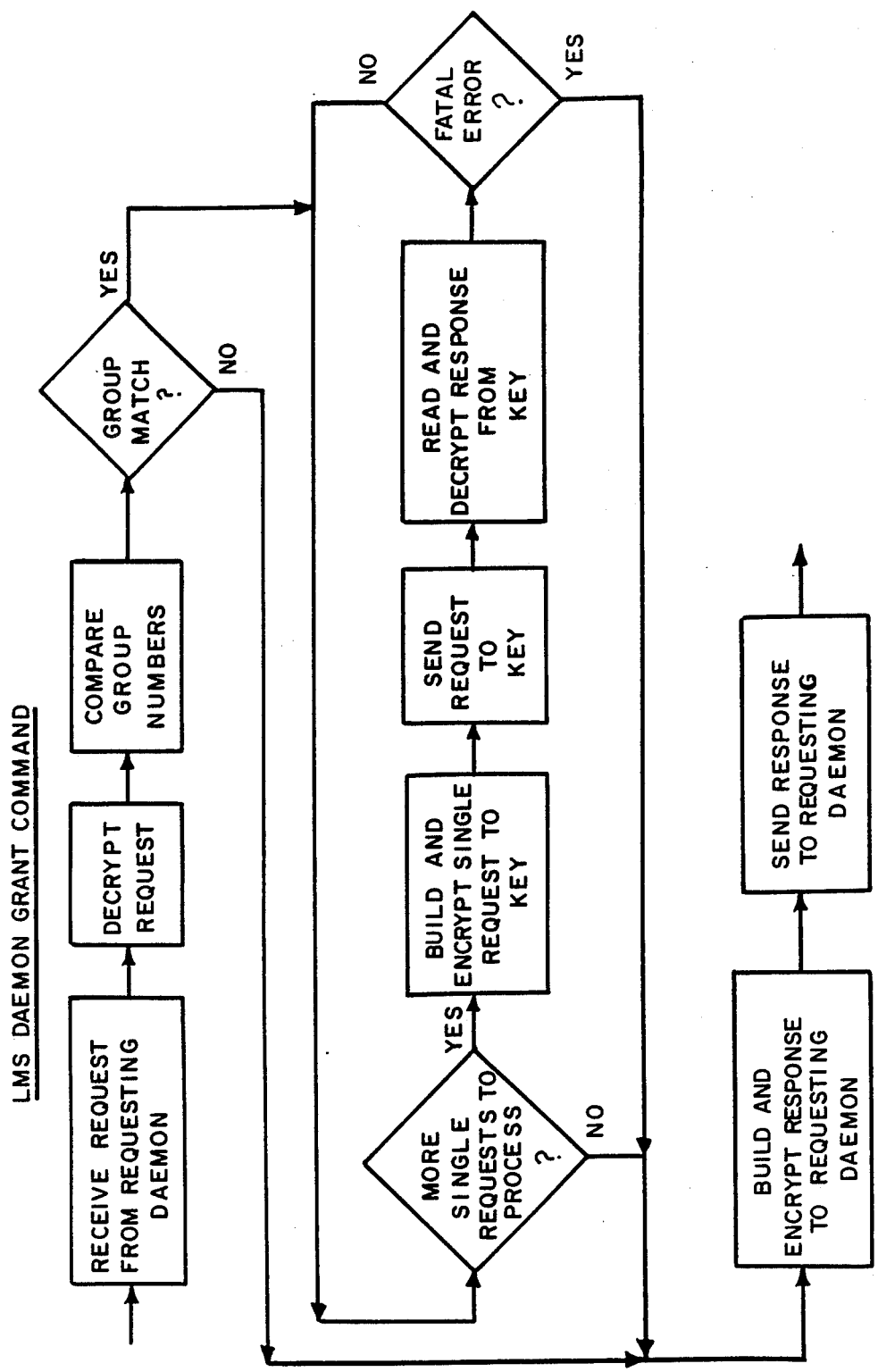
FIG. 8 is a flow chart of the LMS daemon grant command.

Referring now to FIG. 8, the procedure followed in a grant command by the license manager daemon is shown. The group number in the grant command is compared with the group number assigned to the license storage key. The software vendor provides each key before shipping with the appropriate group number. It is important in transferring or granting licenses to make sure that the group numbers are the same.

If the group number of the request does not match the group number of the key, a negative response is prepared, encrypted and sent back to the requesting daemon. If the group numbers do match, the grant command proceeds. The grant requests to the license storage key are made one at a time. The daemon will prepare and encrypt a single request to its key. The request is sent to the key. The key increments the appropriate current license count for the application model number in its memory. The grant command may also specify a time limit which will be stored in the key memory with the license. The key then responds indicating that the grant has or has not been made. The response from the key is decrypted by the daemon. The procedure continues until all of the grant requests have been attempted. A response is built for returning to the requesting daemon. The response will indicate which licenses have been granted and which have not been granted. This encrypted response is then sent to the requesting daemon.

In the unlikely event of a fatal error, the procedure would be stopped and the error indicated. A fatal error will cause the entire system to be brought down. An example of a fatal error is for the I/O to a license storage key to fail. Another fatal error is caused if corrupt data is detected. If either of these is detected, all processes with licenses are alerted and after a predetermined time delay to permit orderly termination of the processes, the system is brought down.

Figure 9:
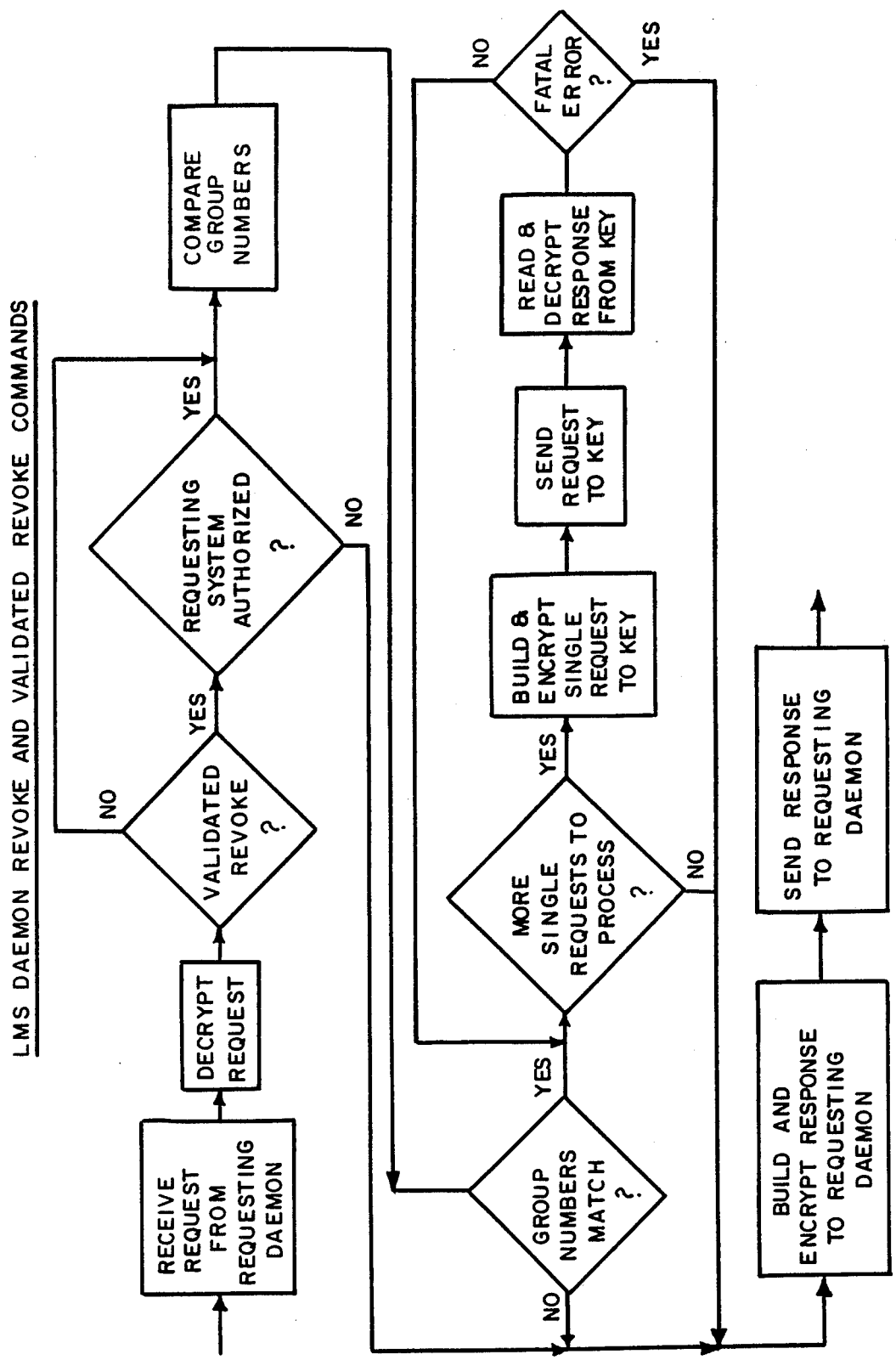
FIG. 9 is a flow chart of the LMS daemon revoke and validated revoke commands.

The other half of a transfer command is the revoke. A daemon receives a request for a revoke or validated revoke from another daemon. As shown in FIG. 9, the request is decrypted. The next step is to ask whether this revoke is a validated revoke command. In the case of validated revoke commands, the requesting system must be on the authorized list to transfer licenses from the local workstation. This list is maintained by a system administrator of the workstations. For a validated revoke command, if the system is not authorized, the daemon will proceed no further with the revoke command and will build a response and return it to the requesting daemon.

The next step is to compare the group numbers. Again, it is important that the group numbers match before permitting a revoke or a grant command to proceed. Revoke commands are handled a single request at a time. A request for a revoke is built and encrypted for sending to the license storage key. A response from the key indicating whether the revoke was or was not completed is decrypted by the daemon. The revoke requests will continue until they have all been attempted.

A license storage key will send back an error in response to a revoke command if the application model number cannot be found in the key. Also, if at the time of the command there are no licenses associated with a requested model number, an error response will also be supplied. Furthermore, if all of the licenses for the application model number are presently assigned to processes, then an error response will also be returned. Thus, a positive acknowledgment signal is only returned when an available license is found for the subject application model number and the key has performed the revoke by reducing the available licenses by one. After all the revoke requests have been attempted, a response is built and encrypted for sending to the requesting daemon. The response will indicate which revokes were successfully accomplished and which ones caused an error signal.

A fatal error is treated in the same manner as was described for a grant command. The procedure is stopped, the error is noted, all processes with licenses are alerted and the system is brought down.

Figure 10:
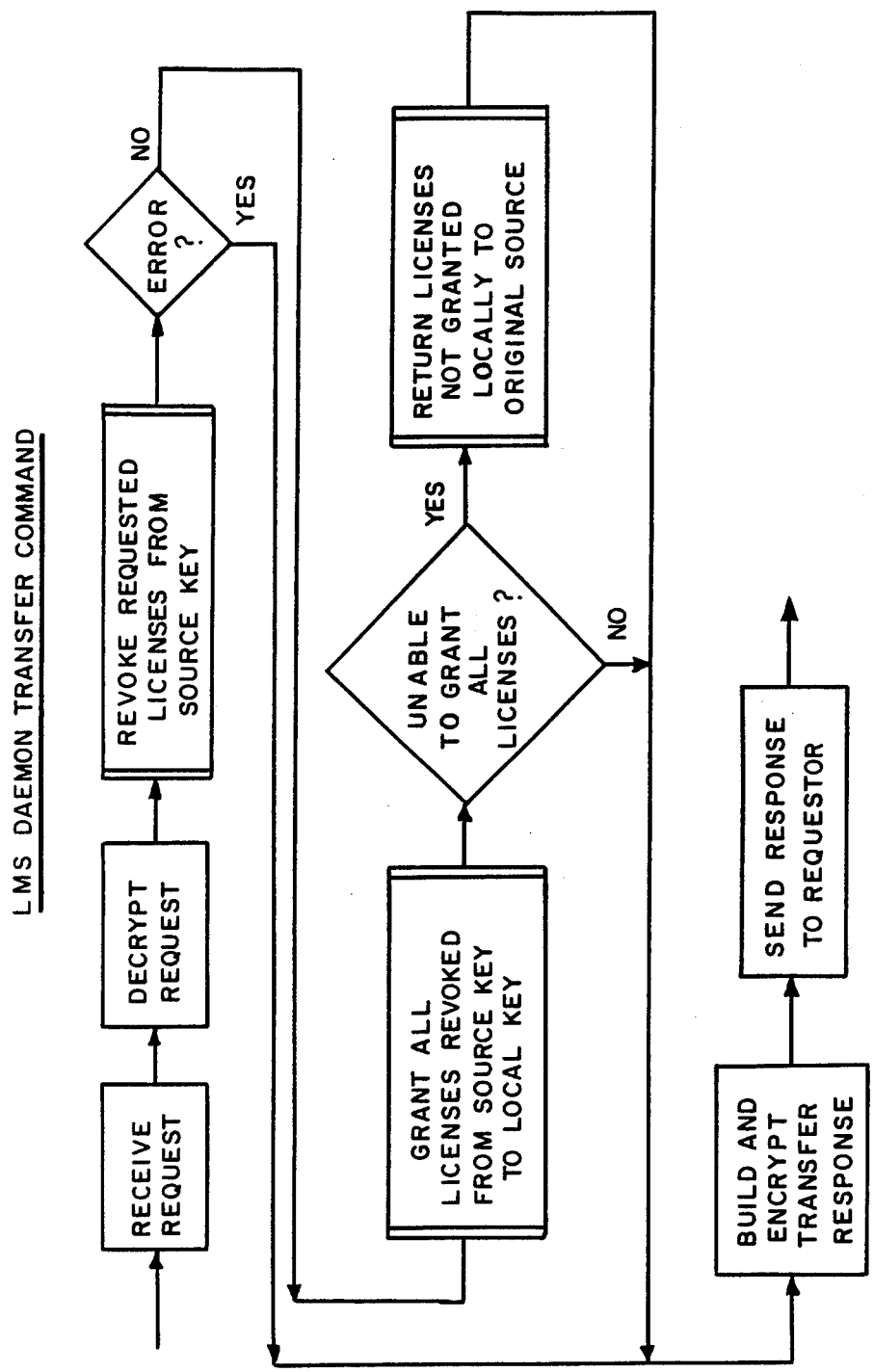
FIG. 10 is a flow chart of the LMS daemon transfer command.

A transfer command to the license manager daemon permits a user to distribute licenses among the various keys at the different work stations on a computer network. The procedure followed in a transfer command is shown in FIG. 10. A work station sends the encoded request to the license management daemon on the workstation to which the licenses are to be transferred. The request is received and decrypted. The destination daemon initiates a revoke command to the daemon controlling the source key to take licenses away from it. If a revoke cannot be successfully accomplished, an error is indicated in response from the source key and a response to that effect is encrypted by the daemon and returned to the requesting work station. If the revoke successfully removed any of the licenses as requested, then grant requests are initiated to grant all these licenses which were revoked from the source key to the designated local key. If all of the licenses which were revoked are granted to the local key as desired, then the positive acknowledgement response is built and encrypted and sent back to the work station. If some of the licenses could not be granted to the local key, then those licenses are returned to the original source. Thus, a grant command is performed to return those licenses to the original source key. In this case, the response which is built will indicate which licenses were successfully transferred and those which were not.

Figure 11:
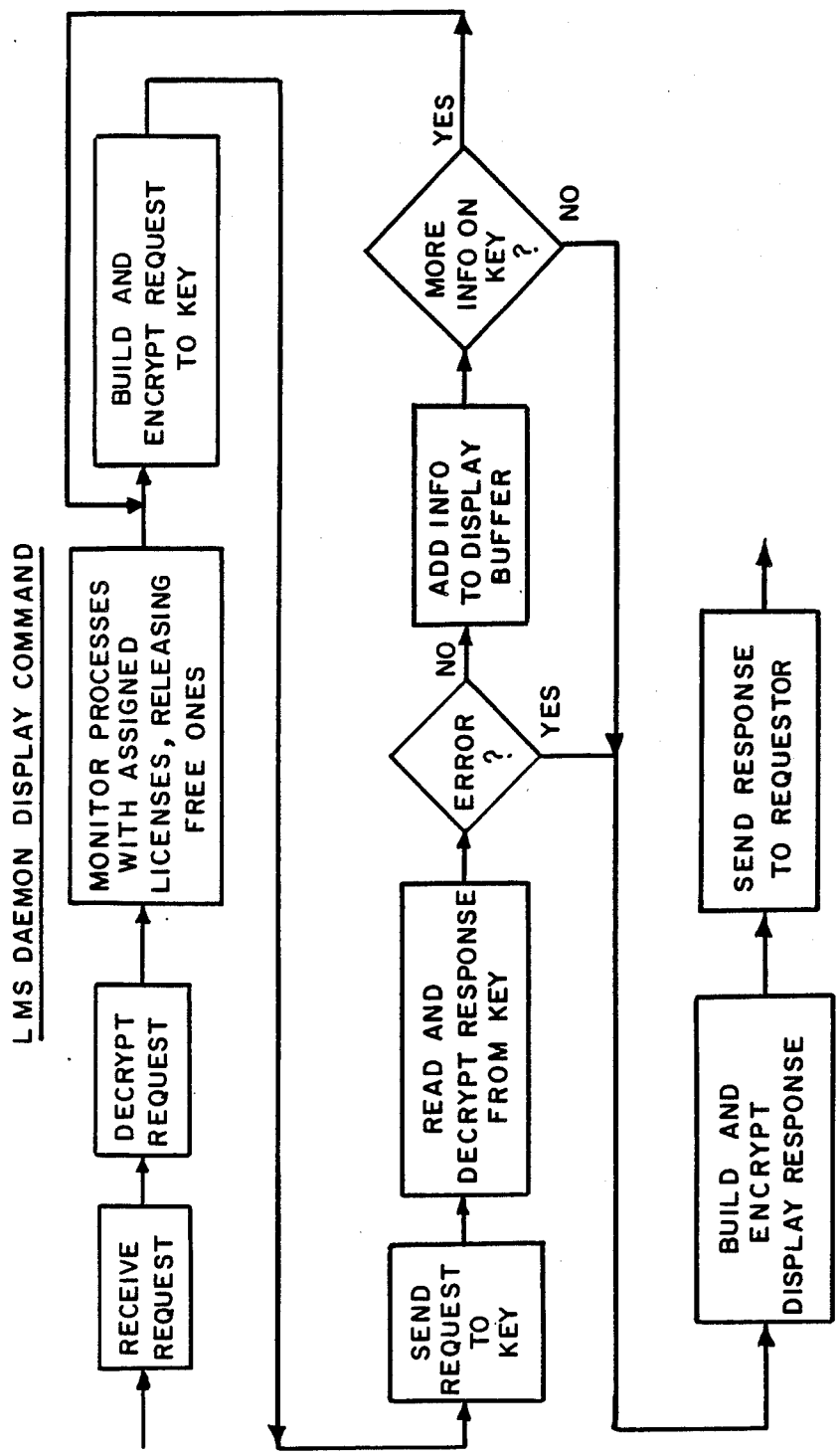
FIG. 11 is a flow chart of the LMS daemon display command.

The license management daemon may be requested to obtain information from the key for display on the work station. It may often be desirable to determine the application programs which have licenses available on the key, the number of licenses available, and perhaps the time limits on those licenses. A license management display command follows the procedure of FIG. 11. After the request has been received and decrypted by the daemon, an update is performed, monitoring the processes with assigned licenses and releasing any licenses which are assigned to a process ID that is now free. Then, the display request can be built and encrypted for the key. The encrypted request is sent to the key. The information returned from the key is read and decrypted. If there is an error in the response, the display response is built and encrypted and sent back to the work station. If there is no error the information is added to the display buffer. If there is more information not yet obtained from the key for display, a subsequent request is made to the key to obtain this further information. The information is collected in the display buffer until all of it has been extracted. Once all of the information has been obtained from the key, it can be encrypted and sent to the work station terminal for display.

Another request that can be sent to the key is a clear key request. This request releases the assignments of all licenses for all the process ID's. In essence, this is a global release request. The clear key request would be used, for example, when rebooting the work station. The flow chart for the clear key request is similar to that for the verify command shown in FIG. 7.

The license management system of the present invention provides ease of loading programs into a customer's computer network. Rather than cop protecting the software and severely restricting access to the computer programs of the software vendor, a vendor can provide tapes or other distribution media that contain all of the programs that the vendor makes available. Each of the programs should be written so as to include checkpoints that interrogate the license management daemon to determine whether a license is available and to make sure a license is assigned before proceeding with the program. At the beginning of the tape or other distribution medium of the software vendor, a directory may be located which will provide the starting location of each of the application programs on the tapes. Loading into a computer network is performed by first providing the network with either one key containing all of the licenses which have been purchased for that network, or a number of keys which cumulatively contain the licenses for the network. It may often be simpler to provide a single key with all of the licenses permitting the user to later transfer the licenses among the keys in the network as the user sees fit. In loading the licensed programs into the computer network, a loading program reviews the directory of application model numbers first and performs a verify operation (FIG. 7) through the license management daemon to determine which of the software programs have licenses available in the network. Then it is a simple matter of copying only those programs which have licenses. It would of course be possible to copy all of the programs on the tapes, but that would merely occupy and waste disk storage space, since the programs which are not licensed would be unable to run on any of the computers in that network. Thus, with the system of the present invention, loading of programs into a computer network can be done without all of the security precautions of the prior art.

In accordance with the present invention, a user at a work station who calls up an application program will advantageously be permitted to run that program if a license is found anywhere in the network of computers. It is no longer required that an application for which a limited number of licenses was purchased be specifically licensed for the user's work station. This system provides enormous flexibility to the user in attaining access to licensed software.

It is a further advantage of the present system that the license storage area is located securely on an external device such as the license storage key. This isolates the license storage information away from software activity which may erase or alter the information.

Of course, it should be understood that various changes and modifications to the preferred embodiment described above will be apparent to those skilled in the art. For example, the multiplexor in the key may not be needed if a dedicated line for the key is available on the work station. Also, the present system may be implemented by providing a single license storage area that has all of the licenses for all of the computers on a network. It is not necessary to provide a separate key at each work station. Nor is it required that the computer on which the licensed application program executes be a work station, it may be any computer with the resources necessary to run the application programs. These and other changes can be made without departing from the spirit and the scope of the invention and without diminishing its attendant advantages. It is therefore intended that such changes and modifications be covered by the following claims.

We claim:

1. A license storage key comprising:
   communication means for sending messages to and receiving messages from a computer;
   memory means for storing a count of licenses for each of a plurality of application programs; and
   a processor, coupled to said communication means and to said memory means, for decoding encrypted messages received through said communication means and for encoding messages for sending through said communication means, said processor including means for assigning a license in said memory means for an execution environment on said computer.

2. The license storage key of claim 1 wherein said means for assigning comprises means for writing a code representative of an execution environment into a storage location in said memory means corresponding to a license to be assigned to said execution environment.

3. The license storage key of claim 1 further comprising a clock for indicating time.

4. The license storage key of claim 3 wherein said memory means further stores a time limit in correspondence with a license for an application program.

5. The license storage key of claim 4 wherein said processor further includes means for comparing the time indicated by said clock with the time limit corresponding to a license in said memory means.

6. The license storage key of claim 1 wherein said communication means connects to a mouse port on said computer.

7. The license storage key of claim 6 further comprising a multiplexor for selecting between a communication line connected to a mouse and a communication line for sending messages encoded by said processor.

8. The license storage key of claim 1 further comprising a storage capacitor for providing said processor with enough power to store its present state in a power outage.

9. The license storage key of claim 1 wherein said processor and said memory means are located in a package containing a battery which becomes disconnected if said package is opened.

10. The license storage key of claim 1 wherein said processor includes means for encrypting data before it is stored in said memory means.

11. A method for loading programs into a computer connected to at least one license storage key having a memory and a processor comprising the steps of:
   providing a distribution medium containing a directory listing every program contained on the medium along with its location on the medium;
   determining for each program in said directory whether or not a license is contained for said program in said at least one license storage key;
   loading only those programs for which a license was found in the memory of said at least one key.

12. The method of claim 11 wherein said step of determining comprises sending an encrypted verify request to said at least one key and receiving an encrypted response from the processor of said at least one key.

13. The method of claim 11 wherein said programs contain checkpoints which prevent a program from being run on an execution environment unless a license for said program in said at least one license storage key is assigned to said execution environment.

14. A computer system comprising
   a computer having a communication port and a plurality of execution environments;
   a license storage key connected to said computer through said communication port and said license storage key having a processor and storage locations corresponding to each of a plurality of application programs; and
   a daemon computer program within said computer for instructing the processor in said license storage key to assign a license to an execution environment so as to cause the processor to store a code representative of said execution environment in one of said storage locations.

15. The computer system of claim 14 wherein said license storage key further stores a time limit in one of said storage locations corresponding to an application program.

16. The computer system of claim 15 wherein said license storage key further comprises a clock for indicating time.

17. The computer sYstem of claim 16 wherein the processor in said license storage key comprises means for comparing the time indicated by said clock with the time limit corresponding to a license in one of said storage locations.

18. The computer system of claim 14 wherein each of said application programs includes means for preventing said application program from running on an execution environment on said computer unless a license for said program is assigned to said execution environment.

19. A computer network comprising:
   a plurality of license storage keys;
   a plurality of computers each in association with one of said license storage keys;
   means for transferring a license from one of said keys to another of said keys;
   means for preventing a program from running on a computer if the key associated with that computer does not contain an available license for that program.

20. The computer network of claim 19 further comprising a clock for keeping time in each of said keys.

21. The computer network of claim 20 wherein each license storage key includes means for storing a time limit in correspondence with a license.

22. The computer network of claim 21 wherein a license is not available if it has a time limit that has expired as compared with the time on said clock.

23. The computer network of claim 19 wherein communications between a license storage key and a computer are encrypted.

24. The computer network of claim 19 wherein each of said license storage keys has a group number and said means for transferring a license is prevented from transferring licenses between license storage keys which have different group numbers.

25. A method for running an application program on a computer having a plurality of execution environments comprising the steps of:
   providing said computer with means for communicating with a license storage key;
   requesting the running of said application program;
   encrypting and sending a request to said license storage key which asks said key to assign a license to an execution environment for said application program if one is available;
   decoding and performing said assign request; and
   running said application program on said computer after a license has been assigned.

26. The method of claim 25 further comprising the step of checking to determine if said execution environment is assigned a license for said application program during the running of said program and terminating the running of said program if a license is not so assigned and no other licenses for said program are available for assignment.

27. The method of claim 25 wherein said license storage key is connected to said computer and further comprising the step of transferring a license for said application program from a remote license storage key to said license storage key connected to said computer if no such license is available on said license storage key connected to said computer.

28. The method of claim 25 further comprising the step of releasing the license assigned to said execution environment for said application program when said application program terminates.

29. The method of claim 25 wherein said step of determining whether a license is available includes checking an unassigned license to determine whether the present time is later than a time limit corresponding to said unassigned license.

* * * * *